United States Patent [19]

Lewis et al.

[11] 4,324,697
[45] Apr. 13, 1982

[54] FLUORIDED COMPOSITE CATALYST

[75] Inventors: Paul H. Lewis, Groves, Tex.; James C. Vartuli, West Chester, Pa.

[73] Assignee: Texaco Inc., White Plains, N.Y.

[21] Appl. No.: 198,662

[22] Filed: Oct. 20, 1980

[51] Int. Cl.$^3$ .............................................. B01J 29/12
[52] U.S. Cl. .............................. 252/455 Z; 252/441; 208/115
[58] Field of Search ............... 252/441, 455 Z, 455 R; 208/115, 135

[56] References Cited

U.S. PATENT DOCUMENTS

| | | | |
|---|---|---|---|
| 3,097,155 | 7/1963 | Friedman et al. | 208/115 X |
| 3,113,844 | 12/1963 | Hemminger | 208/115 X |
| 3,318,821 | 5/1967 | Pollitzer et al. | 252/441 X |
| 4,191,638 | 3/1980 | Plank et el. | 252/455 Z |

*Primary Examiner*—Carl F. Dees
*Attorney, Agent, or Firm*—Cooper, Dunham, Clark, Griffin & Moran

[57] ABSTRACT

An improved cracking catalyst prepared by treating a metallic reforming catalyst with an aqueous solution containing a fluorine compound, drying and calcining the fluorided catalyst, and then physically mixing the fluorided catalyst with a zeolite-containing cracking catalyst. The composite yields higher octane products than conventional cracking catalysts.

3 Claims, No Drawings

FLUORIDED COMPOSITE CATALYST

BACKGROUND OF THE INVENTION

This invention relates to an improved cracking catalyst. More particularly, this invention relates to a composite of a zeolite-containing cracking catalyst and a fluorided reforming catalyst.

Cracking reactions are used to convert heavier hydrocarbons into products having a lower average molecular weight useful in the production of motor fuels. Cracked products generally have a lower octane number than that desired for gasoline blending components. Catalytic reforming is a process which increases the octane number of cracked products by converting low octane hydrocarbons, such as paraffins and naphthenes, into aromatic-rich products. To minimize further processing, such as catalytic reforming operations, it is desirable that the gasoline components of the products of the cracking operation have as high an octane number as possible.

It is known in the art that catalytic activity of solid contact catalysts may be enhanced by incorporating into the catalyst acid activators, such as fluorine, as reported by Choudhary, *Ind. Eng. Chem., Prod. Res. Div.*, 16, 12 (1977). Prior to the advent of zeolite cracking catalysts, amorphous-type catalysts, for example, alumina and silica-alumina catalysts, were enhanced by treatment with various fluorine compounds under anhydrous or aqueous conditions. For example, U.S. Pat. Nos. 2,336,165 (Connolly), 2,483,131 (Garrison), 2,694,674 (Starr et al.), and 2,848,380 (Thomas) all describe the preparation of improved alumina and silica-alumina cracking catalysts by treatment with various fluorine compounds.

More recent patents disclose fluorided reforming and dual-function catalysts. Some of these catalysts contain a zeolite component. For example, U.S. Pat. No. 4,191,638 (Plank et al.) describes a reforming catalyst which comprises a mixture of a zeolite and a conventional reforming catalyst, such as a metallic reforming catalyst. Both the zeolite component and the metallic reforming catalyst contain a halogen component, such as chloride or fluoride.

U.S. Pat. No. 3,702,312 (Wilson) discloses a dual-function catalyst comprising a fluorided zeolite and a hydrogenative metal component prepared by a sequence of steps to incorporate fluorine into the crystalline structure of the zeolite. Attempts to fluoride crystalline alumino-silicate by conventional halide impregnation with an aqueous solution of hydrogen fluoride destroyed the crystalline structure of the zeolite.

U.S. Pat. Nos. 4,097,368 (Hayes) and 4,098,679 (Hayes) describe dual-function composite catalysts comprising a combination of three or four metals on a porous carrier which may comprise a zeolite. Halogen may be added to the carrier material in any suitable manner, for example, by treatment of the carrier material with an aqueous solution of hydrogen fluoride.

The present invention relates to a fluorided cracking catalyst comprising a physical mixture of a fluorided reforming catalyst and a zeolite-containing cracking catalyst. The improved cracking catalyst of the present invention is prepared by treating a metallic reforming catalyst with an aqueous solution containing a fluorine compound, and then physically mixing the fluorided reforming catalyst with a zeolite-containing cracking catalyst. Use of the catalyst of this invention in cracking reactions yields higher octane products than can be obtained with conventional cracking catalyst.

SUMMARY AND DETAILED DESCRIPTION OF THE INVENTION

In accordance with the present invention, an improved cracking catalyst is provided comprising a composite of a zeolite, a carrier material, about 0.05 to about 5 percent by weight of fluorine, and about 5 to about 10 percent by weight of a metallic reforming catalyst, said improved cracking catalyst having been prepared by treating the metallic reforming catalyst with an aqueous solution containing a fluorine compound dissolved therein, followed by drying and calcining the resulting fluorided reforming catalyst, and physically mixing the fluorided reforming catalyst with a zeolite-containing cracking catalyst.

The metallic reforming catalyst of the present invention comprises about 0.01 to about 2 percent by weight of platinum on an alumina support, preferably gamma alumina. Optionally, the reforming catalyst also contains about 0.01 to about 5 percent by weight of a metal selected from the group consisting of germanium, tin, and rhenium. A reforming catalyst containing 0.375 percent by weight of Pt and 0.25 percent by weight of Ge on a gamma alumina support commercially sold under the trade name of UOP R-22 by UOP, Inc., Des Plaines, Illinois, is suitable.

Although the precise form in which fluorine combines with the reforming catalyst is not entirely known, it is customary in the art to refer to the fluorine as being present in the form of fluoride. The present invention, however, is not limited to fluorides but embraces all forms of fluorine incorporated into the metallic reforming catalyst when prepared as described above.

Hydrogen fluoride is the preferred fluoriding agent for this invention although other fluorine compounds, such as ammonium fluoride, ammonium bifluoride, boron trifluoride, ammonium fluoborate, and ammonium fluosilicate, are also suitable. Fluoriding of the metallic reforming catalyst may be accomplished by an incipient wetness impregnation technique carried out at 32° F. Other fluoriding methods, especially impregnation methods, may also be suitable.

Following the fluoriding step, the metallic reforming catalyst should contain about 0.5 to about 5 percent by weight of fluoride, most preferably, about 1 percent by weight. The fluorided metallic reforming catalyst is then dried at a temperature of about 200° F. to about 600° F., preferably about 300° F., for about 2 to about 24 hours. The fluorided metallic reforming catalyst is then calcined for about 0.5 to about 10 hours at a temperature of about 700° F. to about 1100° F., preferably at about 1000° F. Finally, the fluorided reforming catalyst is physically mixed with a zeolite-containing cracking catalyst.

The zeolite which may be used in the practice of this invention may be a naturally occurring or synthetically prepared Y zeolite. Preferably, the zeolite is associated with an alumina-silica matrix that may contain free alumina or free silica.

Cracking is achieved by placing a hydrocarbon charge stock in contact with the improved cracking catalyst described herein. The contacting may be accomplished by any conventional technique, for example, by using the catalyst in a fixed bed system, a moving bed system, a fluidized bed system, or in a batch type operation. The conditions under which the improved cracking catalyst may be used are those customarily used in the art for cracking reactions. Thus, temperatures from about 850° F. to about 1025° F. and pressures of about 10 to about 25 psig are ordinarily used.

The following examples are presented to illustrate more fully the nature and manner of practicing the invention.

EXAMPLES

An improved cracking catalyst was prepared in accordance with the present invention. Catalyst A comprised a metallic reforming catalyst having 0.375 percent by weight platinum and 0.25 percent by weight germanium on a gamma alumina support. Catalyst A was ground to 50 to 200 mesh particle size and was then fluorided with aqueous hydrogen fluoride by an incipient wetness impregnation technique. The aqueous solution containing 0.014 gm of HF per cc was prepared by diluting 4 gm of concentrated HF acid with 136 ml of distilled water. 70 ml of the HF solution was added to 100 gm of Catalyst A at 32° F. with mixing in order to distribute the solution on the catalyst. The nominal loading of the fluoride was 1 percent by weight. After contacting Catalyst A with the HF solution for periods of either 3 or 16 hours, moisture was removed by drying the catalyst at 300° F. The fluorided reforming catalyst was then calcined at 1000° F. for three hours.

In examples 2 through 4, Catalyst A was physically mixed with a commercial zeolite-containing cracking catalyst, Catalyst B. Catalyst B comprised a Y zeolite in an alumina-silica matrix. Catalyst B had previously been used in a commercial cracking operation and had the following characteristics: surface area=98 m²/gm, pore volume=0.36 cc/gm, density (loose)=48.0 lbs/cu. ft., alumina=38.1 wt.%, average particle size=55 microns.

Table 1 sets out the catalysts used in the examples, the period of contact with the fluoriding solution, and the calcining conditions.

TABLE 1

| Example | Catalyst | HF Contact Time, hrs. | Calcination Temp., °F. | Calcination Time, hrs. |
|---|---|---|---|---|
| 1 | B | 0 | — | — |
| 2 | 10% A + 90% B | 0 | — | — |
|   |          | 0 | — | — |
| 3 | 10% A(1% HF)+ 90% B | 16 | 1000 | 3 |
|   |          | 0 | — | — |
| 4 | 10% A(1% HF)+ 90% B | 3 | 1000 | 3 |
|   |          | 0 | — | — |

Tests were conducted in a pulsed feed, fixed bed microreactor unit designed to evaluate cracking catalysts. The tests were conducted at 900° F. with a hydrocarbon charge stock having the following properties:

TABLE 2

| Gravity, °API | 36.7 |
|---|---|
| Viscosity at 100° F., cs. | 4.3 |
| Viscosity at 210° F., cs. | 1.5 |
| Pour Point, °F. | 20 |
| Sulfur wt. % | 0.08 |
| Conradson Carbon Residue, wt. % | None |
| Bromine No. | 3 |
| ASTM Distillation (D-2887) | °F. |
| Initial Boiling Point | 318 |
| 5% | 435 |
| 10% | 465 |
| 20% | 498 |
| 30% | 522 |
| 40% | 543 |

TABLE 2-continued

| 50% | 566 |
|---|---|
| 60% | 586 |
| 70% | 610 |
| 80% | 645 |
| 90% | 692 |
| 95% | 735 |
| End Point | 856 |

In each of the test runs of the examples, 4 grams of catalyst were contacted with 1.3 grams of the test feed during a 75 second pulse at 1 atmosphere pressure. The catalyst to oil weight ratio was 3 and the Weight Hourly Space Velocity (WHSV) was 16.

The liquid products from the tests were collected in a receiver cooled in an ice-water bath and analyzed on a chromatograph. Conversion, naphtha and gas oil were determined by ASTM Method D-2887-73. The naphtha was the liquid product fraction with a boiling point below 421° F. The gas oil was the fraction with a boiling point above 421° F. Conversion was calculated as the percentage of the original charge with a boiling point below 421° F. following cracking.

Research Octane Numbers (RON) were calculated by analyzing the naphtha fraction into specific groups and assigning an octane factor to each group. The octane numbers of the products are based upon the amount of each specific group in the product and the octane factor assigned to each group. See P. C. Anderson, J. M. Sharkey, and R. P. Walsh, *J. Inst. Pet.*, 58, 83 (1972).

Differences beteen similar preparations are attributed to the different fluoriding conditions shown in Table 1. For instance, the contact period was 16 hours for example 3 and 3 hours for example 4. Results of the test runs are summarized in Table 3 below.

TABLE 3

| Example | 1 | 2 | 3 | 4 |
|---|---|---|---|---|
| Catalyst | B | 10% A+ 90% B | 10% A(1% HF)+ 90% B | 10% A (1% HF)+ 90% B |
| No. of Runs | 9 | 7 | 4 | 5 |
| RON, Calculated | 89.26 | 89.90 | 90.51 | 90.93 |
| Δ RON | — | +0.64 | +1.25 | +1.67 |
| Conversion, wt. % | 61.40 | 55.33 | 50.55 | 47.56 |
| Naphtha wt. % | 38.08 | 36.27 | 30.50 | 30.54 |
| Gas Oil, wt. % | 38.60 | 44.67 | 49.45 | 52.44 |
| Carbon, wt. % | 8.37 | 8.88 | 8.89 | 8.25 |
| Gas, wt. % | 14.96 | 10.18 | 11.16 | 8.77 |

The test runs demonstrate that a fluorided metallic reforming catalyst mixed with a zeolite-containing cracking catalyst yields a higher octane product than is produced by unfluorided catalysts. The improvement in octane number demonstrated in these test runs may be attributed to the enhanced aromatization and dehydrogenation activity of fluorided reforming catalyst.

While the invention has been described by reference to specific examples, these examples were for purposes of illustration only. They should not be construed to limit the spirit or scope of the invention.

We claim:

1. An improved composite cracking catalyst consisting essentially of from about 90 to about 95 percent by weight of a composite of a Y zeolite in a silica-alumina matrix, and from about 5 to about 10 percent by weight of a fluorided metallic reforming catalyst comprising platinum on alumina and containing from about 0.01 to about 2 percent by weight platinum and from about 0.5 to about 5 percent by weight fluorine.

2. An improved cracking catalyst in accordance with claim 1 wherein said metallic reforming catalyst also contains a catalytically effective amount of a metal selected from the group consisting of tin, germanium, and rhenium.

3. An improved cracking catalyst in accordance with claim 1 wherein said fluorided reforming catalyst contains about 1 percent by weight of fluoride.

* * * * *